(12) United States Patent
Nakamichi

(10) Patent No.: US 11,439,133 B2
(45) Date of Patent: Sep. 13, 2022

(54) LURE

(71) Applicant: Shimano Inc., Osaka (JP)

(72) Inventor: Tadasuke Nakamichi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/381,830

(22) Filed: Jul. 21, 2021

(65) Prior Publication Data

US 2022/0061280 A1 Mar. 3, 2022

(30) Foreign Application Priority Data

Aug. 26, 2020 (JP) .............................. JP2020-142237

(51) Int. Cl.
*A01K 85/01* (2006.01)
(52) U.S. Cl.
CPC .................... *A01K 85/01* (2013.01)
(58) Field of Classification Search
CPC ........ A01K 85/00; A01K 85/01; A01K 85/12; A01K 85/16
See application file for complete search history.

(56) References Cited

U.S. PATENT DOCUMENTS 11,388,893 B2 * 7/2022 Naumovitz ............ A01K 85/18
2019/0320634 A1 * 10/2019 Kawasaki ............ A01K 85/16

FOREIGN PATENT DOCUMENTS

JP 2019-187246 A 10/2019

* cited by examiner

*Primary Examiner* — Thomas M Sember
(74) *Attorney, Agent, or Firm* — Global IP Counselors, LLP

(57) ABSTRACT

A lure includes a first and second body parts, a structure in which the first and second body parts are coupled together, and an interior cavity, and a rod bridging the first and second body parts in the interior cavity. The rod has a rod portion, a flange portion connected to a first end of the rod portion, and a projecting portion projecting from the flange portion to an opposite side of the rod portion. The first body part has an inner surface and a rod hole on the inner surface thereof. The second body part has an inner surface and a base projecting from the inner surface thereof, and a receiving hole recessed from the surface of the base. A second end of the rod portion is inserted into the rod hole, the projecting portion inserted into the receiving hole, and the flange portion in contact with the base.

8 Claims, 4 Drawing Sheets

LURE

CROSS-REFERENCE TO RELATED APPLICATIONS

This application claims priority to Japanese Patent Application No. 2020-142237, filed on Aug. 26, 2020. The entire disclosure of Japanese Patent Application No. 2020-142237 is hereby incorporated herein by reference.

BACKGROUND

Field of the Invention

The present invention relates to a lure that is used for fishing.

Background Art

Large fish, such as largemouth bass, yellowtail and yellowtail juveniles, and sea bass, prey on small fish. These large fish are called fish eaters. Lure fishing is a popular way to catch fish eaters. In lure fishing, lures resembling bait, such as small fish, are used. The lure is cast and flies through the air, eventually landing in the water. The lure is designed to appear to be swimming through the water when the fishing line is taken up or reeled in. A fish eater, mistaking the lure for bait, bites the lure, and a hook attached to the lure is embedded in the fish eater. The fish eater can then be reeled in. The frequency with which fish eaters bite the lure is called the hit rate.

In recent years, various mechanisms have been incorporated into lures to increase the hit rate. For example, Japanese Laid-Open Patent Application No. 2019-187246 discloses a lure with a cavity inside a transparent body, and a swinging part that reflects light disposed inside the cavity. The swinging of the swinging part of the lure changes the light reflection state, which attracts fish eaters. In another lure, a rattle ball is disposed in a cavity. As the lure moves, the ball rolls and produces sounds which attract fish eaters. Various types of lures with built-in mechanisms are disclosed in the "2019 Shimano Fishing Tackle Catalog" issued by Shimano, Inc.

SUMMARY

Some lures include a cavity inside the body and can have a shaft that extends leftward and rightward in the cavity. For example, the lure of the third embodiment of Japanese Laid-Open Patent Application No. 2019-187246 has a hanging rod (shaft) that passes to the left and right through a hole formed in a swinging part. When the lure is assembled, a first body part and a second body part, shaped in the form of the lure body divided into two left and right parts, are prepared. Normally, the shaft is divided at the center, where one part is integrally formed with the first body part and the other part is integrally formed with the second body part. The first and second body parts are coupled together such that the tips of the divided shafts abut, thereby completing the lure. However, with this lure, with the application of an external load, the body deforms and the abutting parts can shift. This shifting can interfere with the operation of the incorporated mechanism. For example, in the lure of Japanese Laid-Open Patent Application No. 2019-187246, the shifting of the abutting parts can impede the swinging of the swinging part. Such a lure would not be able to effectively attract fish eaters. Moreover, since high positioning accuracy of the abutting parts is required, the ability to assemble the lure can be difficult.

An object of embodiments of the present invention is to provide a lure that attracts fish eaters and that is easy to assemble.

The lure according to an embodiment of the present invention comprises a body, having a first body part and a second body part, a structure with which the two body parts can be couples together, and an interior cavity, and a rod in the cavity bridging the first body part and the second body part. The rod comprises a rod portion, a flange portion that is connected to a first end of the rod portion, and a projecting portion that projects from the flange portion to the opposite side of the rod portion. The inner surface of the first body part contains a rod hole. The second body part has a base that projects from the inner surface and a receiving hole that is recessed from the surface of the base. The second end of the rod portion is inserted into the rod hole, the projecting portion is inserted into the receiving hole, and the flange portion is in contact with the base.

In one embodiment, the surface of the base in contact with the flange portion is the same size as the surface of the flange portion that comes into contact with the base, or is larger than the surface of the flange portion that comes into contact with the base.

In one embodiment, the rod hole has an inclined portion, the diameter of which gradually decreases from the opening in the depth direction, and a constant diameter portion that is continuous with the inclined portion and that has a constant diameter.

In one embodiment, the diameter of the constant diameter portion is larger than the diameter of the rod portion.

In one embodiment, the center axis of the rod portion coincides with the center axis of the projecting portion.

In one embodiment, the diameter of the projecting portion is smaller than the diameter of the rod portion.

In one embodiment, the lure has a light-emitting swinging part attached to the body so as to be movable in the cavity and that has a hole through which the rod passes, and the body is configured such that the light from the swinging part is visible from the outside.

In one embodiment, the swinging part is capable of moving even after the lure is brought from an operating (or moving) state to a stopped state.

In the lure according to an embodiment of the present invention, a rod comprises a rod portion, a flange portion is connected to the rod portion, and a projecting portion projects from the flange portion to the opposite side of the rod portion. One end of the rod portion is inserted into a rod hole of a first body part, the projecting portion is inserted into a receiving hole provided on the surface of a base of the second body part, and the flange portion is in contact with the base. Since the rod of the lure is not divided, there are no abutting parts which require high positioning accuracy. The lure is easily assembled. Because the lure contains no abutting parts, even with externally applied loads, no shifting of the abutting parts can take place. The operation of the incorporated mechanism is not impeded, and the lure is capable of effectively attracting fish eaters.

DETAILED DESCRIPTION OF EMBODIMENTS

The present invention will be described in detail below based on preferred embodiments and with reference to the drawings, as is suitable.

Figure 1:
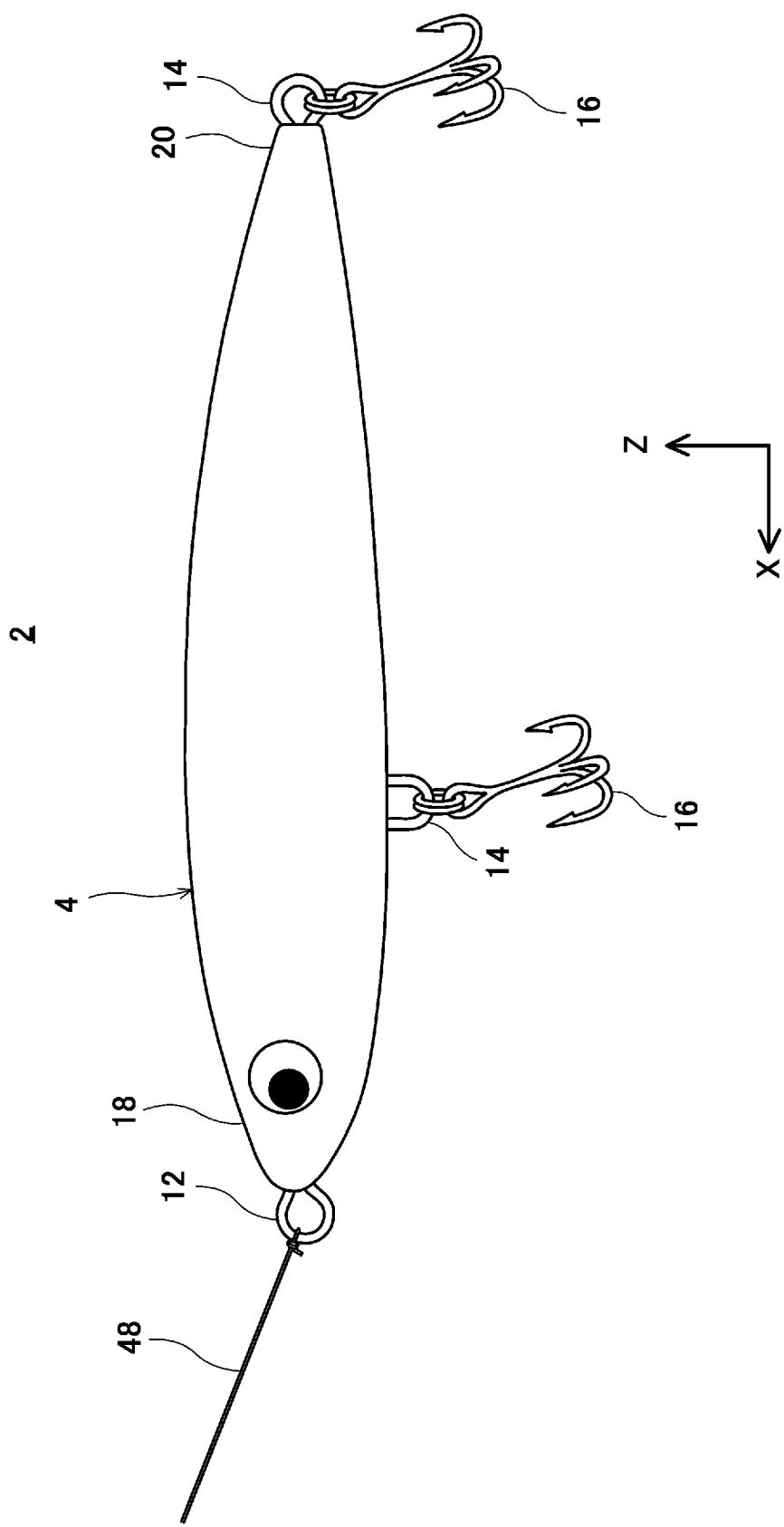
FIG. 1 is a side view illustrating a lure according to one embodiment of the present invention.
Figure 2:
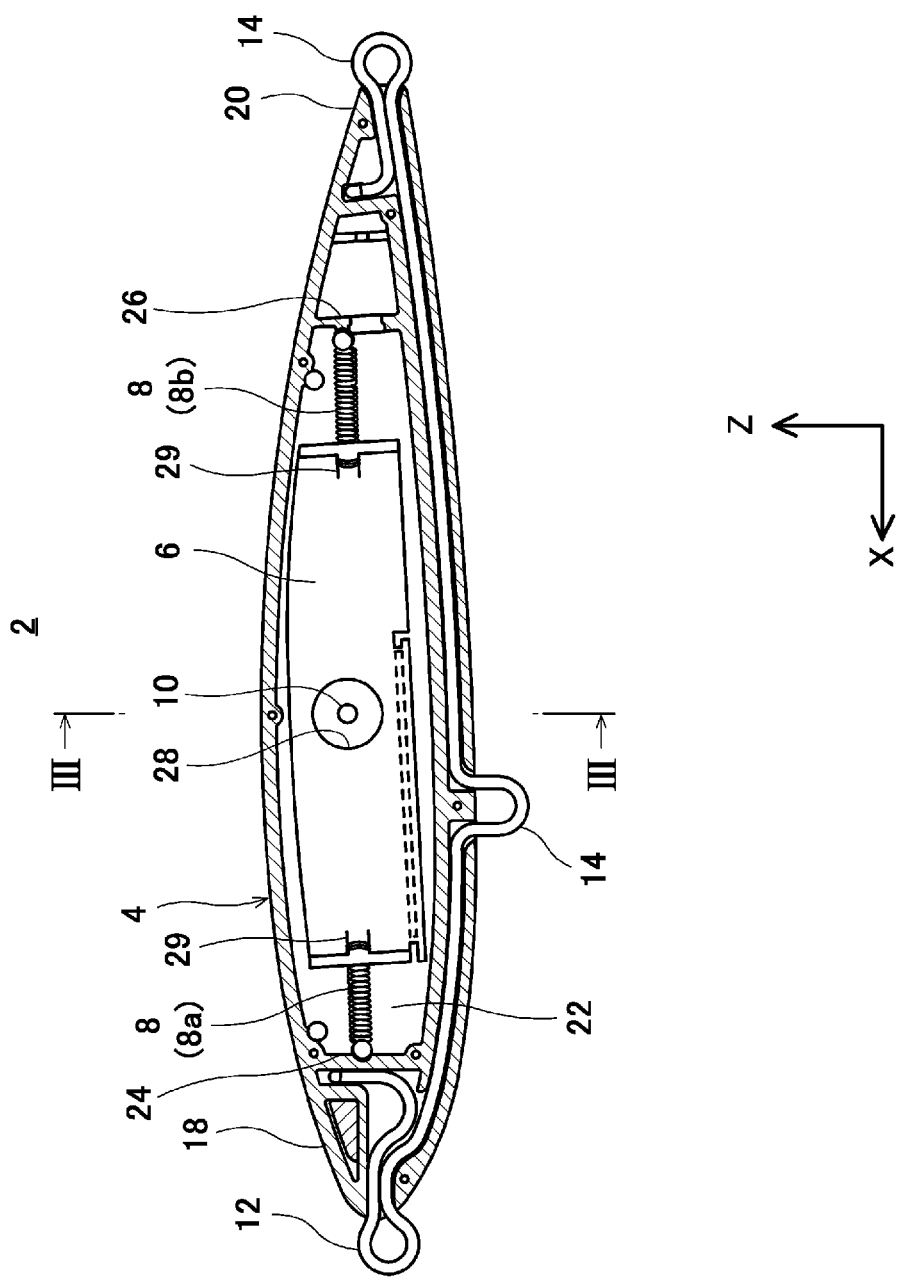
FIG. 2 is a cross-sectional view taken along the longitudinal direction of the lure of FIG. 1.
Figure 3:
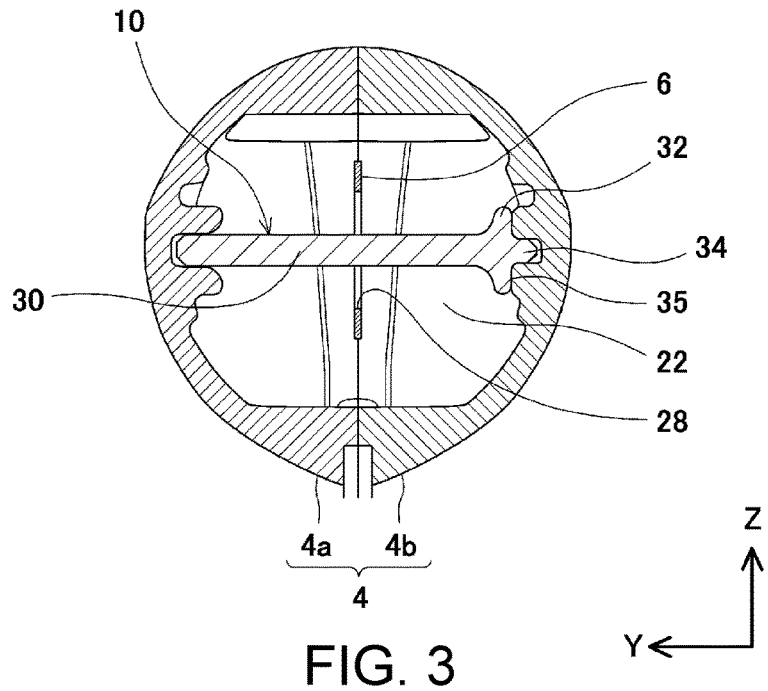
FIG. 3 is a cross-sectional view taken along line of FIG. 2.

FIG. 1 is a side view illustrating a lure 2 according to one embodiment of the present invention. In FIG. 1, the direction indicated by arrow X is defined as the front of the lure 2, and the opposite direction is the defined as the rear of the lure 2. The direction indicated by arrow Z is defined as the upper side of the lure 2, and the opposite direction is defined as the underside of the lure 2. The direction perpendicular to the plane of the paper is the left-right direction of the lure 2. FIG. 2 is a cross-sectional view taken along the longitudinal direction of the lure 2 of FIG. 1. FIG. 3 shows a cross section through line of FIG. 2. In FIG. 3, the direction indicated by arrow Y is defined as the direction toward the right side of the lure 2, and the opposite direction is the defined as the direction toward the left side of the lure 2. The direction indicated by arrow Z is defined as the upper side of the lure 2, and the opposite direction is defined as the underside of the lure 2. The direction perpendicular to the plane of the paper is the longitudinal direction of the lure 2. As shown in FIGS. 1-3, the lure 2 comprises a body 4, a swinging part 6, an elastic body 8, a rod (shaft) 10, a line eye 12, hook eyes 14, and hooks 16.

The exterior shape of the body 4 resembles that of a small fish, such as bait fish. The body 4 is formed from a hard material. Typically, the body 4 is formed from a synthetic resin composition. The body 4 can also be formed from a soft material such as an elastomer. The front portion of the body 4 is referred to as the head 18, and the rear portion is referred to as the tail 20.

As shown in FIG. 3, the body 4 has a first body part 4a and a second body part 4b generally for two halves of the body. The first body part 4a and the second body part 4b extend in the longitudinal direction. The body 4 is formed by coupling (e.g., by bonding or gluing) the first body part 4a and the second body part 4b from the left and right directions. The body 4 has a structure in which the first body part 4a and the second body part 4b are bonded from the left and right directions. In other words, the cross-sectional view of FIG. 2 is a side view of the lure 2 with the second body part 4b removed.

As shown in FIGS. 2 and 3, the body 4 has an internal cavity 22. In this embodiment, the body 4 is sufficiently transparent to allow light to pass into the cavity 22. Therefore, although not shown in FIG. 1, the interior of the cavity 22 can be seen from the outside. The swinging part 6 of the lure 2 can also be seen from the outside. As shown in FIG. 2, the body 4 also includes a front wall 24 and a rear wall 26. The region between the front wall 24 and the rear wall 26 is the cavity 22.

Figure 4:
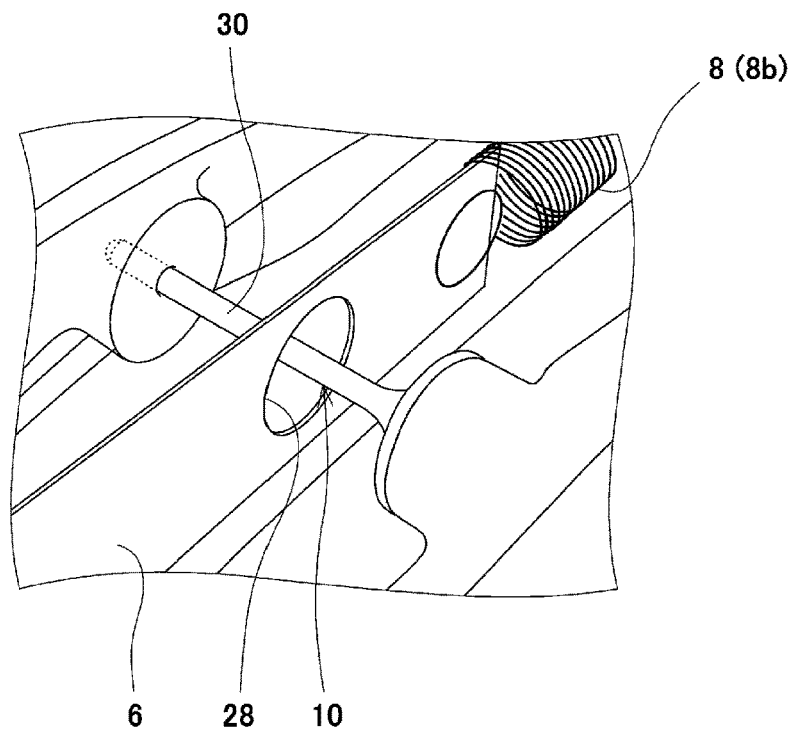
FIG. 4 is a perspective view showing the internal structure of the lure of FIG. 1.

The swinging part 6 is positioned within the cavity 22. FIG. 4 is a perspective view showing the region of the swinging part 6. As shown in FIGS. 2 and 4, the swinging part 6 extends in the longitudinal direction. The swinging part 6 is plate-shaped. As shown in FIGS. 2-4, the swinging part 6 has a hole 28 that passes therethrough in the thickness direction. As shown in FIG. 2, a notch 29 is disposed at the front-end portion and the rear-end portion of the swinging part 6.

The swinging part 6 receives light from the outside and emits light. In this embodiment, the swinging part 6 is a reflector. That is, the surface of the swinging part 6 reflects light. The surface of the swinging part 6 is glossy and can be colored or have a pattern. Typically, the swinging part 6 is formed from a synthetic resin composition. However, the swinging part 6 can be made of metal. An example of a typical swinging part 6 is a hologram plate (or reflector).

The elastic body 8 is positioned within the cavity 22. In the present embodiment, the elastic body 8 is a spring 8. FIG. 2 of this embodiment shows a first spring 8a and a second spring 8b. The first spring 8a is hooked onto the notch 29 at the front-end portion of the swinging part 6. The first spring 8a extends forward from the front end of the swinging part 6. The second spring 8b is hooked onto the notch 29 at the rear-end portion of the swinging part 6. The second spring 8b extends rearward from the rear end of the swinging part 6. The swinging part 6 is attached between the first spring 8a and the second spring 8b.

As shown in FIG. 2, the front end of the first spring 8a is suspended from the front wall 24. The rear end of the second spring 8b is suspended from the rear wall 26. The swinging part 6 is attached to the body 4 by the springs 8. The swinging part 6 can vibrate with respect to the body 4 by the springs 8. The swinging part 6 can swing back and forth, up and down, and left and right by the springs 8. The swinging part 6 is movable with respect to the body 4 by the springs 8. The swinging part 6 is attached to the body 4 so as to be movable via the springs 8.

As shown in FIGS. 3 and 4, the rod 10 bridges the first body part 4a and the second body part 4b. One end of the rod 10 is attached to the first body part 4a, and the other end of the rod 10 is attached to the second body part 4b. The rod 10 passes through the hole 28 of the swinging part 6. As shown in FIG. 3, the rod 10 has a rod portion 30, a flange portion 32, and a projecting portion 34.

The rod portion 30 extends in the left-right direction. In this embodiment, the cross-sectional shape of the rod portion 30 is circular; however, it is not necessary for the cross-sectional shape of the rod portion 30 to be circular. That is, the cross-sectional shape of the rod portion 30 can be elliptical or polygonal. In this disclosure, the direction that extends from the center axis of the rod portion 30 perpendicular to the longitudinal direction of the rod portion 30 is referred to as the "radial direction" of the rod 10. In addition, the outer diameter of the smallest circle surrounding the cross section of the rod portion 30 is referred to as the "diameter of the rod portion 30." If the cross section of the rod portion 30 is circular, the "diameter of the rod portion 30" coincides with the outer diameter of the aforementioned circle. The "diameter of the flange portion 32" and the "diameter of the projecting portion 34" are defined similarly.

The flange portion 32 is connected to the first end of the rod portion 30. The flange portion 32 projects radially outward from the rod portion 30. In other words, the diameter of the flange portion 32 is greater than the diameter of the rod portion 30. In this embodiment, the cross-sectional shape of the flange portion 32 is circular; however, it is not necessary for the cross-sectional shape of the flange portion 32 to be circular. That is, the cross-sectional shape of the flange portion 32 can be elliptical or polygonal.

The projecting portion 34 projects from the flange portion 32 to the opposite side (second body part 4*b* side) of the rod portion 30. The projecting portion 34 projects from a surface (bottom surface 35 of the flange portion 32) of the flange portion 32 on the opposite side of the surface that is connected to the rod portion 30. The diameter of the projecting portion 34 is smaller than the diameter of the flange portion 32. In this embodiment, the cross-sectional shape of the projecting portion 34 is circular; however, it is not necessary for the cross-sectional shape of the projecting portion 34 to be circular. That is, the cross-sectional shape of the projecting portion 34 can be elliptical or polygonal.

In this embodiment, the rod portion 30, the flange portion 32, and the projecting portion 34 are integrally formed. These elements can be separately formed and bonded together. A typical material for the rod 10 is a synthetic resin composition. The rod 10 can be made of metal.

Figure 5A:
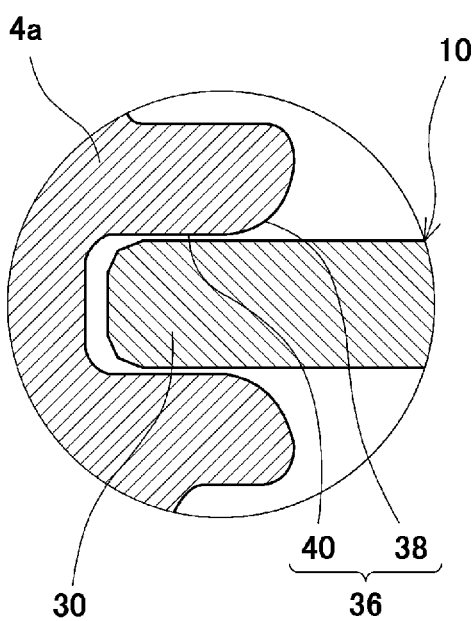
FIG. 5A is an enlarged cross-sectional view in the vicinity of one end of the rod of FIG. 3.

FIG. 5A is an enlarged cross-sectional view showing the joining portion of the rod 10 and the first body part 4*a*. As shown in FIG. 5A, the inner surface of the first body part 4*a* has a rod hole 36. The rod hole 36 has an inclined portion 38 and an constant diameter portion 40. In the inclined portion 38, the diameter gradually decreases from the opening in the depth direction. The constant diameter portion 40 is continuous with the inclined portion 38. The diameter of the constant diameter portion 40 is constant. In this embodiment, the cross-sectional shape of the inclined portion 38 of the rod hole 36 and the cross-sectional shape of the constant diameter portion 40 are both circular. However. it is not necessary for the cross-sectional shapes of the inclined portion 38 and the cross-sectional shape of the constant diameter portion 40 to be circular That is, the cross-sectional shape thereof can be elliptical or polygonal. The "diameter" of the inclined portion 38, having a cross-sectional shape that is non-circular, "gradually decreases" means that the cross-sectional area of the inclined portion 38 gradually decreases. The "diameter of the constant diameter portion 40 is constant" means that the cross-sectional shape is the same over the entire constant diameter portion 40.

As shown in FIG. 5A, a second end of the rod portion 30 (the end on the opposite side of the flange portion 32 side) is inserted into the shaft hole 36. The rod portion 30 is inserted up to the constant diameter portion 40 of the rod hole 36.

Figure 5B:
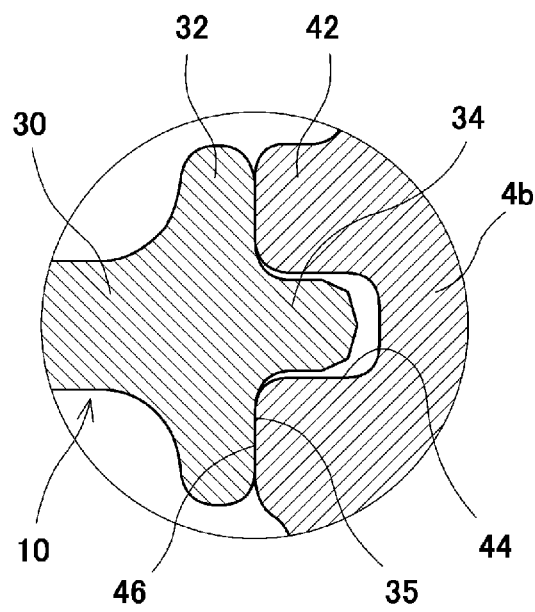
FIG. 5B is an enlarged cross-sectional view in the vicinity of the other end of the rod of FIG. 3.

FIG. 5B is an enlarged cross-sectional view showing the joining portion of the rod 10 and the second body part 4*b*. As shown in FIG. 5B, the second body part 4*b* has a base (e.g., a pedestal) 42 that protrudes from the inner surface and a receiving hole 44 that is recessed from a first body part 4*a* side surface (front side surface 46 of the base 42) of the base 42. In this embodiment, the shape of the front side surface 46 of the base 42 circular. However, it is not necessary for the shape of the front side surface 46 of the base 42 to be circular. That is, the shape of the front side surface 46 of the base 42 can be elliptical or polygonal. In this embodiment, the cross-sectional shape of the receiving hole 44 is circular; however, it is not necessary for the cross-sectional shape of the receiving hole 44 to be circular. That is, the cross-sectional shape of the receiving hole 44 can be elliptical or polygonal.

As shown in FIG. 5B, the projecting portion 34 of the rod 10 is inserted into the receiving hole 44. At this time, the flange portion 32 and the base 42 are in contact with each other. Specifically, the front side surface 46 of the base 42 is in contact with the bottom surface 35 of the flange portion 32. In this embodiment, the front side surface 46 of the base 42 is of the same size as the bottom surface 35 of the flange portion 32. The front side surface 46 of the base 42 may be larger than the bottom surface 35 of the flange portion 32. That is, the front side surface 46 of the base 42 may protrude in the radial direction from the bottom surface 35 of the flange portion 32. The bottom surface 35 of the flange portion 32 need not protrude from the front side surface 46 of the base 42.

The line eye 12 is attached to the front end of the head 18. The hook eyes 14 are attached to the tail 20 and to the vicinity of the center of the body 4. The line eye 12 and the hook eyes 14 are formed by bending metal wires. The two ends of the metal wires are embedded in the body 4. The line eye 12 and the hook eyes 14 are firmly fixed to the body 4 and a line 48 can be attached to the line eye 12. A hook 16 is attached to each hook eye 14. In this exemplary embodiment, the number of hooks 16 is two.

When this lure 2 is assembled, the first body part 4*a*, the second body part 4*b*, the metal wires that form the line eye 12 and the hook eyes 14, the first spring 8*a*, the second spring 8*b*, the swinging part 6, and the rod 10 are prepared. The metal wires for the line eye 12 and the hook eyes 14, the first spring 8*a*, the second spring 8*b*, and the swinging part 6 are attached to the first body part 4*a*. The rod portion 30 of the rod 10 is passed through the hole 28 of the swinging part 6, and the second end of the rod portion 30 is inserted into the rod hole 36 of the first body part 4*a*. The second body part 4*b* is placed on the first body part 4*a* and the projecting portion 34 of the rod 10 is inserted into the receiving hole 44 of the second body part 4*b*. The surfaces of the first body part 4*a* and the second body part 4*b* that contact each other are welded. The lure 2 is thereby completed.

The action and effects of embodiments of the present invention will now be described.

In the lure 2 according to an embodiment of the present invention, the rod 10 comprises the rod portion 30, the flange portion 32, and the projecting portion 34 that projects from the flange portion 32 to the opposite side of the rod portion 30. The second end of the rod portion 30 is inserted into the rod hole 36 of the first body part 4*a*, and the projecting portion 34 is inserted into the receiving hole 44 of the base 42 disposed on the second body part 4*b* in order to attach the rod 10 to the body 4. The attachment is easily performed. The lure 2 is easily assembled.

Since, unlike a conventional lure, the rod 10 of the lure 2 is not divided, there are no abutting parts between one end of the divided rod 10 and the other end. In this lure, high positioning accuracy at the time of assembly is not required. Therefore, the lure 2 is easily assembled.

Since the lure 2 does not have abutting parts, even if a load were applied to the lure 2, there are no abutting parts that could shift. The operation of the swinging part 6 is not hindered by shifting abutting parts. The operation of the incorporated mechanism of the lure 2 for attracting fish eaters is not hindered, and the lure according to this embodiment effectively attracts fish eaters.

The flange portion 32 of the rod 10 and the base 42 of the second body part 4*b* of the lure 2 are in contact with each other. Since the flange portion 32 that protrudes from the rod portion 30 contacts the base 42, the rod 10 is stably attached to the body 4. Even if a load or impact is applied to the lure 2, the rod 10 is prevented from detaching from the body 4.

The front side surface 46 of the base 42 is preferably of the same size as the bottom surface 35 of the flange portion 32, or is larger than the bottom surface 35 of the flange portion 32. The rod 10 can thus be more stably attached to the body 4. Even if a load or impact is applied to the lure 2, the rod 10 is prevented from detaching from the body 4. From this standpoint, it is preferable that the front side surface 46 of the base 42 be larger than the bottom surface 35 of the flange portion 32.

In this embodiment, the rod hole 36 has the inclined portion 38 in which the diameter gradually decreases from the opening in the depth direction. This inclined portion 38 guides the end of the rod 10 to the constant diameter portion 40 during assembly of the lure 2. During assembly of the lure 2, the rod 10 can be easily inserted into the constant diameter portion 40 of the rod hole 36. Therefore, this embodiment of the lure 2 is easily assembled.

It is preferable that the diameter of the constant diameter portion 40 be larger than the diameter of the rod portion 30. That is, it is preferable that there be a gap between the rod portion 30 and the constant diameter portion 40 when the rod portion 30 is inserted into the constant diameter portion 40. The rod portion 30 of the rod 10 can thereby be easily inserted into the constant diameter portion 40. Therefore, this embodiment of the lure 2 is easily assembled.

In the rod 10, it is preferable that the center axis of the rod portion 30 coincide with the center axis of the projecting portion 34. In this way, the force applied to the rod 10 from the first body part 4a side and the force applied to the rod 10 from the second body part 4b side are placed so as to be opposite each other on the center axis. As a result, even if a load is applied to the lure 2 from the left and right direction, the rod 10 is prevented from detaching from the body 4.

The diameter of the projecting portion 34 of the rod 10 is preferably smaller than the diameter of the rod portion 30. The projecting portion 34 with a small diameter can be easily inserted in the receiving hole 44 of the base 42. Therefore, this embodiment of the lure 2 is easily assembled.

In this embodiment, the lure 2 has a light-emitting swinging part 6 in the cavity 22 of the body 4. The swinging part 6 is a reflector. The surface of the swinging part 6 reflects light. The body 4 is sufficiently transparent to allow light to pass into the cavity 22. Light reflected by the swinging part 6 is visible from the outside, and therefore the light reflected by the swinging part 6 is capable of attracting fish eaters. Accordingly, a high hit rate can be expected with the lure 2.

In this embodiment, the swinging part 6 is attached to the body 4 via the springs 8. In the moving state of the lure 2, such as when the angler pulls or reels in the lure 2 or when the flow of the water or the tide is fast, the swinging part 6 swings back and forth, up and down, and left and right by the springs 8, and the reflected state of the light changes due to the movement of the swinging part 6. That is, the appearance of the light emitted from the swinging part 6 changes, since the swinging part 6 appears to scintillate. This effectively attracts fish eaters, and a high hit rate can be expected with the lure 2.

In this embodiment, the swinging part 6 is attached to the body 4 via the springs 8 so as to be movable. The springs 8 continue to move for a while, even when the lure 2 changes from a moving state to a stopped state, such as when the angler stops pulling the lure 2 or when the flow of the water or tide stops. The swinging part 6 continues to swing back and forth, up and down, and left and right for a while, even when the lure 2 changes from the moving state to the stopped state. The swinging part 6 appears to scintillate at this time as well. Thus, the swinging part 6 continues to effectively attract fish eaters for a while, even after the lure 2 is brought into a stopped state, and a high hit rate can be expected with the lure 2.

In this embodiment, the rod 10 passes through the hole 28 of the swinging part 6. When the swinging part 6 is stationary when the lure 2 is in the normal swimming posture, the rod 10 is not in contact with the inner surface of the hole 28 of the swinging part 6. When the swinging part 6 moves, the swinging part 6 can contact the rod 10. The rod 10 limits the range of movement of the swinging part 6 in the front-rear and up-down directions. As a result of the pronounced movement of the swinging part 6 by the rod 10, it is possible to prevent the swinging part 6 from being pinched by or caught in the structure within the cavity 22. The swinging part 6 is prevented from becoming fixed in an unusual position. In addition, the rod 10 prevents excessive swinging of the swinging part 6. The swinging part 6 can swing at a high frequency, and the swinging part 6 appears to scintillate. This effectively attracts fish eaters, and a high hit rate can be expected with the lure 2.

The swinging part 6 is preferably attached between the first spring 8a and the second spring 8b. This attachment prevents excessive swinging of the swinging part 6. The swinging part 6 can swing at a high frequency, and the swinging part 6 appears to scintillate. This effectively attracts fish eaters, and a high hit rate can be expected with the lure 2.

As described above, the swinging part 6 continues to swing back and forth, up and down, and left and right for a while, even when the lure 2 changes from the moving state to the stopped state. The period of time that the lure 2 oscillates is preferably 3 seconds or more, more preferably 5 seconds or more, and even more preferably 10 seconds or more.

From the standpoint of effectively attracting fish eaters, the reflectance of the swinging part 6 is preferably 0.3 or more, more preferably 0.5 or more, and even more preferably 0.7 or more.

In the embodiment described above, the elastic body is a spring 8; however, the elastic body need not be the spring 8. For example, the elastic body can be rubber. The elastic body can be any elastic body that can vibrate the swinging part.

In the embodiment described above, the swinging part 6 is a reflector. The swinging part can be a fluorescent body or a phosphorescent body that emits light received from the outside. The swinging part can be a transmissive body that collects or diffuses light received from the outside. Examples of typical transmissive bodies are lenses and prisms.

The swinging part can also be light-emitting body that emits light by itself. An example of a typical light-emitting body is a chemiluminescent body that utilizes luminescence by a chemical reaction. Another example of a light-emitting body is a light-emitting device. For example, a swinging part in which a light-emitting diode and a battery are fixed to the main body thereof can be used.

The present invention has been described above by embodiments of lures for fish. Although not mentioned above, the present invention can also be applied to lures for marine animals other than fish, such as squid.

As described above, the lure according to embodiments of the present invention can effectively attract fish eaters. In addition, this lure has an excellent ability to be assembled. The advantages of the present invention are therefore clear.

The lure according to embodiments of the present invention is suitable for fishing in various types of bodies of water, such as lakes, ponds, dams, rivers, and oceans.

What is claimed is:

1. A lure, comprising:
a body, having a first body part and a second body part, a structure in which the first and second halves are coupled together, and an interior cavity; and
a rod bridging the first body part and the second body part in the interior cavity,
the rod having a rod portion, a flange portion connected to a first end of the rod portion, and a projecting portion projecting from the flange portion to an opposite side of the rod portion,
the first body part having an inner surface and a rod hole on the inner surface thereof,
the second body part having an inner surface and a base projecting from the inner surface thereof, and a receiving hole recessed from the surface of the base, and
a second end of the rod portion being inserted into the rod hole, the projecting portion being inserted into the receiving hole, and the flange portion being in contact with the base.

2. The lure according to claim 1, wherein
a surface of the base in contact with the flange portion is a same size as a surface of the flange portion that comes into contact with the base, or is larger than the surface of the flange portion that comes into contact with the base.

3. The lure according to claim 1, wherein
the rod hole has an inclined portion in which a diameter gradually decreases from an opening in a depth direction, and an constant diameter portion that is continuous with the inclined portion and that has a constant diameter.

4. The lure according to claim 3, wherein
the diameter of the constant diameter portion is greater than the diameter of the rod portion.

5. The lure according to claim 1, wherein
a center axis of the rod portion coincides with a center axis of the projecting portion.

6. The lure according to claim 1, wherein
a diameter of the projecting portion is smaller than a diameter of the rod portion.

7. The lure according to claim 1, further comprising
a light-emitting swinging part attached to the body so as to be movable in the cavity and a hole through which the rod passes, and
the body is configured such that the light reflected from the swinging part is visible from the outside.

8. The lure according to claim 7, wherein
the swinging part is configured to move after the lure changes from a moving state to a stopped state.

* * * * *